US011711189B2

(12) United States Patent
Osawa et al.

(10) Patent No.: US 11,711,189 B2
(45) Date of Patent: Jul. 25, 2023

(54) USER TERMINAL AND RADIO COMMUNICATION METHOD

(71) Applicant: NTT DOCOMO, INC., Tokyo (JP)

(72) Inventors: Ryosuke Osawa, Tokyo (JP); Kazuki Takeda, Tokyo (JP); Hiroki Harada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/471,097

(22) PCT Filed: Dec. 21, 2017

(86) PCT No.: PCT/JP2017/045869
§ 371 (c)(1),
(2) Date: Jun. 19, 2019

(87) PCT Pub. No.: WO2018/117207
PCT Pub. Date: Jun. 28, 2018

(65) Prior Publication Data
US 2020/0022176 A1     Jan. 16, 2020

(30) Foreign Application Priority Data
Dec. 21, 2016     (JP) .................................. 2016-247586

(51) Int. Cl.
*H04L 5/00*     (2006.01)
*H04L 27/26*     (2006.01)
(Continued)

(52) U.S. Cl.
CPC .......... *H04L 5/0051* (2013.01); *H04L 5/0048* (2013.01); *H04L 27/261* (2013.01);
(Continued)

(58) Field of Classification Search
CPC ..... H04L 5/0007; H04L 5/0044; H04L 5/005; H04L 1/1812; H04L 5/0048;
(Continued)

(56) References Cited

U.S. PATENT DOCUMENTS

| | | | | |
|---|---|---|---|---|
| 2010/0067464 A1* | 3/2010 | Higuchi | ................ | H04W 16/10 370/329 |
| 2011/0268087 A1* | 11/2011 | Kwon | .................... | H04L 5/001 370/331 |

(Continued)

OTHER PUBLICATIONS

Coexistence of CP OFDM and CP DFT-s-OFDM for NR UL, Oct. 10-14, 2016, InterDigital Communications, pp. 1-4 (Year : 2016).*
(Continued)

*Primary Examiner* — Michael Thier
*Assistant Examiner* — Prince A Mensah
(74) *Attorney, Agent, or Firm* — Osha Bergman Watanabe & Burton LLP

(57) ABSTRACT

The present invention is designed to suitably reduce the degradation of spectral efficiency even when communication is performed using a waveform of a single-carrier transmission scheme. According to one aspect of the present invention, a user terminal has a receiving section that receives a downlink control signal, which schedules transmission of a data signal in accordance with a waveform that is based on a single-carrier transmission scheme, and a transmission section that transmits a sounding reference signal, which is different from an uplink sounding reference signal used in existing LTE and which has a wider transmission bandwidth than the data signal, by using the waveform based on the single-carrier transmission scheme.

13 Claims, 12 Drawing Sheets

(51) Int. Cl.
*H04W 72/23* (2023.01)
*H04W 72/542* (2023.01)

(52) U.S. Cl.
CPC ......... *H04W 72/23* (2023.01); *H04W 72/542* (2023.01); *H04L 27/2636* (2013.01); *H04L 27/26526* (2021.01)

(58) Field of Classification Search
CPC . H04L 5/0051; H04L 27/261; H04L 27/2636; H04L 27/26526; H04L 27/2649; H04W 72/0413; H04W 72/042; H04W 72/0446; H04W 72/0808; H04W 72/1231; H04W 72/1289; H04W 72/23; H04W 72/542
See application file for complete search history.

(56) References Cited

U.S. PATENT DOCUMENTS

| | | | | |
|---|---|---|---|---|
| 2012/0082124 | A1* | 4/2012 | Kwon | H04L 5/0091 370/329 |
| 2013/0016705 | A1* | 1/2013 | Zhang | H04L 5/0048 370/336 |
| 2015/0126239 | A1* | 5/2015 | Kim | H04W 52/146 455/522 |
| 2016/0344460 | A1* | 11/2016 | Frank | H04B 7/0632 |
| 2017/0188352 | A1* | 6/2017 | Lee | H04L 5/0044 |
| 2018/0124710 | A1* | 5/2018 | Ly | H04L 1/00 |
| 2018/0351719 | A1* | 12/2018 | Lee | H04L 5/0048 |
| 2019/0222385 | A1* | 7/2019 | Hessler | H04W 72/1268 |
| 2019/0238247 | A1* | 8/2019 | Lee | H04L 27/12 |
| 2019/0253122 | A1* | 8/2019 | Yang | H04B 7/0639 |
| 2020/0036470 | A1* | 1/2020 | Olesen | H04L 1/0025 |

OTHER PUBLICATIONS

International Search Report issued in PCT/JP2017/045869 dated Mar. 20, 2018 (1 page).
Written Opinion of the International Searching Authority issued in PCT/JP2017/045869 dated Mar. 20, 2018 (3 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Office Action in counterpart Japanese Patent Application No. 2018-558064 dated Jan. 5, 2022 (6 pages).
Spreadtrum Communications; "Considerations on UL sounding RS design for NR MIMO"; 3GPP TSG RAN WG1 Meeting #87, R1-1611476; Reno, USA; Nov. 14-18, 2016 (4 pages).
Office Action in counterpart Japanese Patent Application No. 2018-558064 dated Jul. 12, 2022 (6 pages).
Ericsson; "Design considerations for phase noise tracking RS (PTRS)"; 3GPP TSG-RAN WG1 #87, R1-1612333; Reno, USA; Nov. 14-18, 2016 (4 pages).
Office Action issued in Japanese Application No. 2018-558064; dated Oct. 4, 2022 (6 pages).

* cited by examiner

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). Also, the specifications of LTE-A (also referred to as "LTE-Advanced," "LTE Rel. 10," "LTE Rel. 11," "LTE Rel. 12," etc.) have been drafted for further broadbandization and increased speed beyond LTE (also referred to as "LTE Rel. 8" or "LTE Rel. 9"), and successor systems of LTE (also referred to as, for example, "FRA (Future Radio Access)," "5G (5th generation mobile communication system)," "NR (New Radio)," "Nx (New radio access)," "FX (Future generation radio access)," "LTE Rel. 13," "LTE Rel. 14" or "LTE. Rel. 15" and so on) are under study.

Carrier aggregation (CA) to integrate multiple component carriers (CC) is introduced in LTE Rel. 10/11 in order to achieve broadbandization. Each CC is configured with the system band of LTE Rel. 8 as one unit. Furthermore, in CA, a plurality of CCs of the same base station (referred to as an "eNB (evolved Node B)," a "BS (Base Station)" and so on) are configured in a user terminal (UE: User Equipment).

Meanwhile, in LTE Rel. 12, dual connectivity (DC), in which multiple cell groups (CG) are configured in a UE, is also introduced. Each cell group is comprised of at least one cell (CC). In DC, since multiple CCs of different base stations are integrated, DC is also referred to as "inter-base-station CA (Inter-eNB CA)."

Also, in LTE Rel. 8 to 12, frequency division duplex (FDD), in which downlink (DL) transmission and uplink (UL) transmission are made in different frequency bands, and time division duplex (TDD), in which DL transmission and UL transmission are switched over time and made in the same frequency band, are introduced.

CITATION LIST

Non-Patent Literature

Non-Patent Literature 1: 3GPP TS36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

Future radio communication systems (for example, 5G, NR, etc.) are expected to realize various radio communication services so as to fulfill mutually varying requirements (for example, ultra high speed, large capacity, ultra-low latency, etc.).

For example, NR is under study to provide radio communication services referred to as "eMBB (enhanced Mobile Broad Band)," "mMTC (massive Machine Type Communication)," "URLLC (Ultra Reliable and Low Latency Communications)," and so on.

In NR, for the uplink, a study is in progress to support waveforms that are based on two kinds of transmission schemes. One of these is a multi-carrier transmission scheme, and the other one is a single-carrier transmission scheme.

In the uplink of existing LTE (for example, LTE Rel. 13) using a single-carrier transmission scheme, measurement reference signals (SRSs: Sounding Reference Signals) are transmitted for channel measurements.

However, the problem with SRS in existing LTE is increased overhead, because the single-carrier transmission scheme limits the use of resources. Such an overhead may cause a decrease in spectral efficiency and a decrease in communication throughput.

The present invention has been made in view of the above, and it is therefore an object of the present invention to provide a user terminal and a radio communication method that can suitably reduce the degradation of spectral efficiency even when communication is performed using a waveform that is based on a single-carrier transmission scheme.

Solution to Problem

A user terminal according to one aspect of the present invention has a receiving section that receives a downlink control signal, which schedules transmission of a data signal in accordance with a waveform that is based on a single-carrier transmission scheme, and a transmission section that transmits a sounding reference signal, which is different from an uplink sounding reference signal used in existing LTE and which has a wider transmission bandwidth than the data signal, by using the waveform based on the single-carrier transmission scheme.

Advantageous Effects of Invention

According to the present invention, even when communication is performed using a waveform that is based on a single-carrier transmission scheme, it is possible to suitably suppress the degradation of spectral efficiency.

DESCRIPTION OF EMBODIMENTS

NR is planned to support waveforms that are based on two different transmission schemes, at least in the uplink for eMBB (which may be referred to as "multiplexing scheme," "modulation scheme," "access scheme," "waveform scheme," etc.). To be more specific, these two kinds of waveforms are a waveform based on cyclic prefix OFDM (CP-OFDM: Cyclic Prefix Orthogonal Frequency Division Multiplexing) and a waveform based on DFT-spread OFDM (DFT-S-OFDM: Discrete Fourier Transform Spread Orthogonal Frequency Division Multiplexing).

Note that the waveforms may be characterized based on whether or not DFT precoding (spreading) is applied to the OFDM waveform. For example, CP-OFDM may be referred to as the "waveform (signal) to which DFT precoding is not applied," and DFT-S-OFDM may be referred to as the "waveform (signal) to which DFT precoding is applied." A "waveform" may also be referred to as "waveform signal," "signal in accordance with waveform," "waveform of signal," "signal," and so on.

The network (such as a base station (also referred to as "gNB")) may command a UE to use either the waveform based on CP-OFDM or the waveform based on DFT-S-OFDM (or commands the UE to switch between the waveforms). The command may be reported to the UE through higher layer signaling, physical layer signaling (for example, downlink control information (DCI)), or a combination thereof.

As higher layer signaling, for example, RRC (Radio Resource Control) signaling, MAC (Medium Access Control) signaling (for example, MAC control elements (MAC CEs)), broadcast information (MIB (Master Information Block) and SIBs (System Information Blocks)) and so on may be used.

Now, in the uplink of existing LTE (for example, LTE Rel.13) where DFT-S-OFDM is used, measurement reference signals (SRSs: Sounding Reference Signals) are transmitted for channel measurements. The SRSs include the periodic SRS, which is transmitted at a predetermined cycle, and the aperiodic SRS, which is triggered by DCI.

Figure 1:
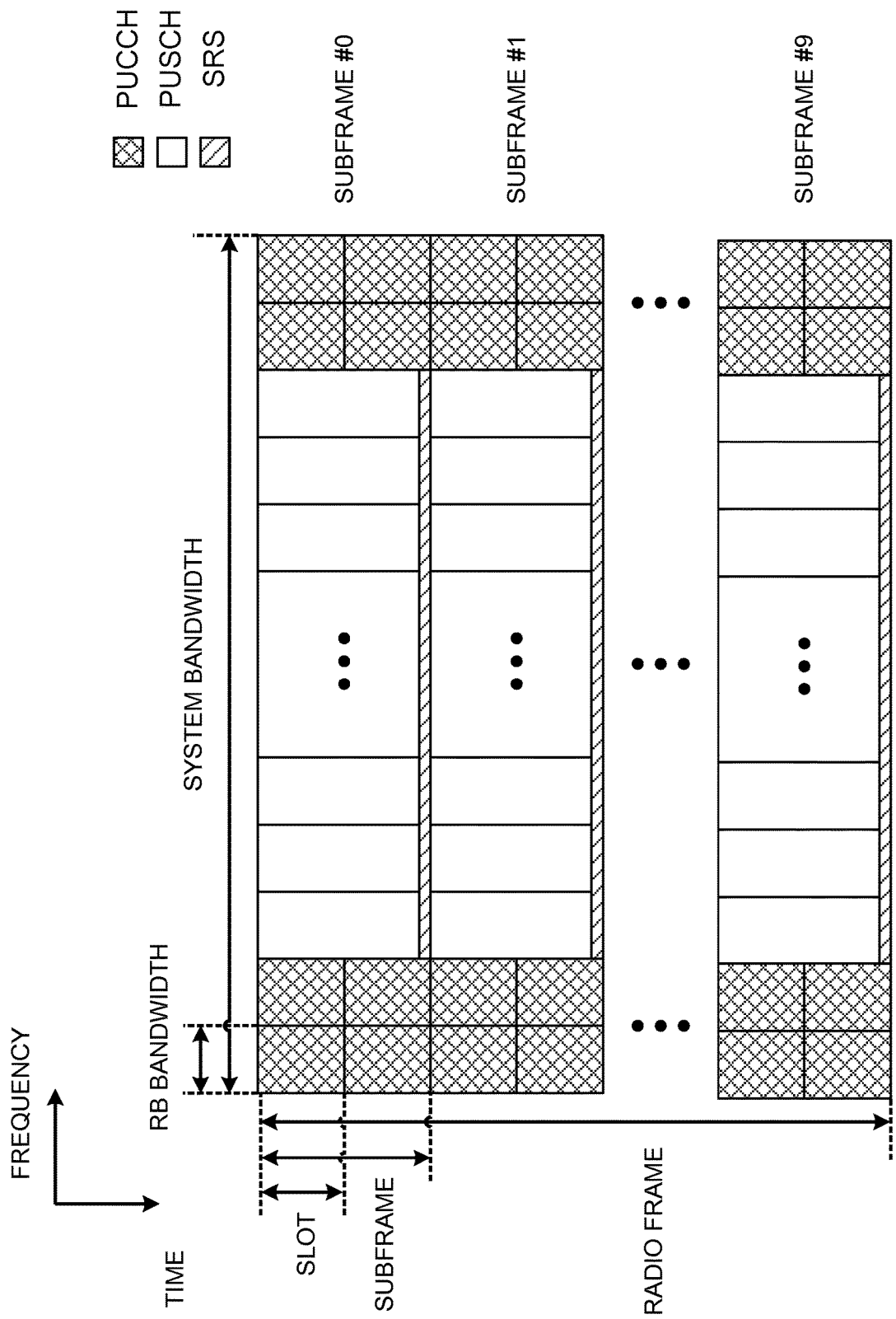
FIG. 1 is a diagram to show an example of resource allocation for SRSs used in existing LTE.

FIG. 1 shows an example of resource allocation for SRSs used in existing LTE. As shown in FIG. 1, for example, in subframes, the frequency fields at both ends of the system bandwidth may be used as resources for an uplink control channel (PUCCH: Physical Uplink Control Channel). Resource allocation may be performed on a per resource block (RB) basis. Furthermore, frequency fields apart from those for the PUCCH may be used as resources for an uplink shared channel (PUSCH: Physical Uplink Shared Channel).

The last symbols in subframes may be used as resources for SRSs. In FIG. 1, SRSs are allocated to frequency fields that overlap with those of the PUSCH, but this is by no means limiting. SRSs may overlap with the PUCCH, or may be transmitted across the system bandwidth.

SRSs in existing LTE must be placed in consecutive frequency and/or time resources, due to the limitations imposed by DFT-S-OFDM. Wide band SRSs are transmitted in a wide band (for example, in nearly the entire system band), and therefore entail a large frequency overhead. In addition, narrowband SRSs—designed so that SRSs of narrow bands are made to "hop" and be transmitted in a number of SRS transmissions—require a long time for measurements (sounding), and entail a large overhead in time. These overheads may cause a decrease in spectral efficiency, a decrease in communication throughput, and so on.

Therefore, the present inventors have come up with a method of using a signal that shares resources with other reference signals as a measurement reference signal. By this means, even when DFT-S-OFDM is adopted, it is possible to reduce the resources required for measurement reference signals. Furthermore, it is possible to realize flexible scheduling.

Now, embodiments of the present invention will be described in detail below with reference to the accompanying drawings. Note that the radio communication methods according to the herein-contained embodiments may be used individually or may be used in combination.

(Radio Communication Method)

First Embodiment

In a first embodiment of the present invention, a predetermined reference signal is expanded to a band that is wider than the transmission bandwidth for data signals (for example, PUSCH-allocating bandwidth), and used for measurements. This predetermined reference signal may be referred to as "band-enhanced reference signal," "new measurement reference signal," "enhanced reference signal" and so on.

The enhanced reference signal is a reference signal apart from the SRSs used in existing LTE (for example, LTE Rel. 13), and may be a signal that is based on at least one of uplink reference signals used in existing LTE (for example, the demodulation reference signal (DMRS: DeModulation Reference Signal)), downlink reference signals used in existing LTE (for example, the cell-specific reference signal (CRS), the channel state information reference signal (CSI-RS), etc.), other new reference signals (for example, the reference signal for identifying beams (BSR: beam-specific RS)), the reference signal for phase tracking (PT-RS: Phase Tracking RS) and so on.

The enhanced reference signal may be referred to as a "reference signal to share at least part of the resources with other reference signals." Also, the enhanced reference signal may be referred to as a "reference signal to be transmitted in symbols other than the last symbol in a predetermined subframe."

With the first embodiment, a UE may or may not transmit existing SRSs in DFT-S-OFDM. In the latter case, resources that would conventionally be allocated to SRSs can be used to transmit other signals (for example, data signals), so that the spectral efficiency can be improved.

Figure 2:
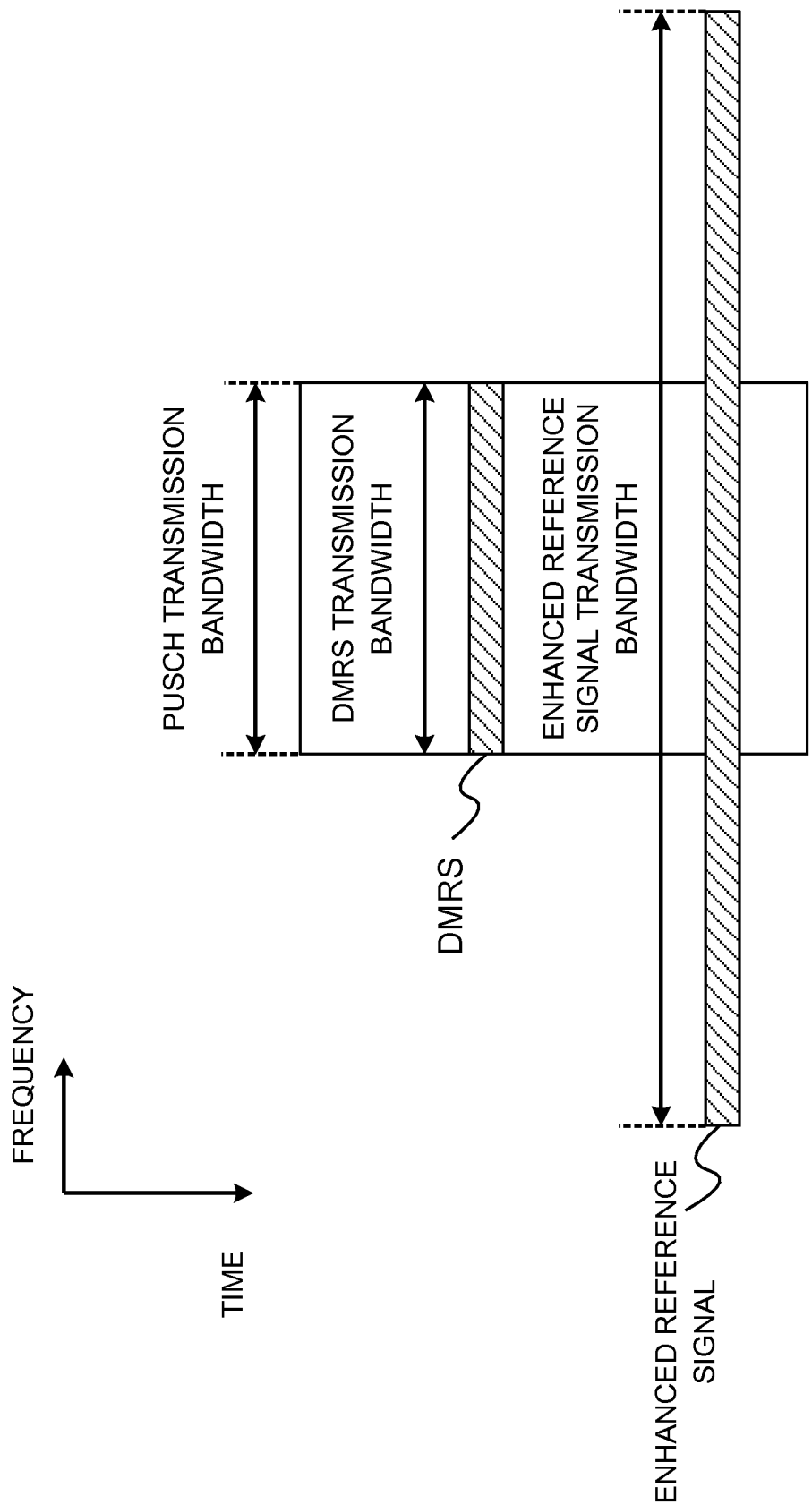
FIG. 2 is a diagram to show an example of an enhanced reference signal.

FIG. 2 shows an example of an enhanced reference signal. The transmission bandwidth of the normal DMRS is the same as the PUSCH transmission bandwidth. Meanwhile, an enhanced DMRS (DMRS for measurement) may have a transmission bandwidth that is larger than the PUSCH transmission bandwidth, and may have, for example, the same transmission bandwidth as that of existing SRSs.

The sequence of an enhanced reference signal may be one that is acquired by increasing the sequence length of the base reference signal so as to support the transmission bandwidth of the enhanced reference signal. A part or the whole of the sequence of an enhanced reference signal may be comprised of a sequence that is different from the sequence of the base reference signal.

For example, an enhanced reference signal may be formed so that the sequence of the base reference signal is allocated to the field of the PUSCH transmission bandwidth, and a sequence other than the sequence of the base reference signal is allocated to a field not overlapping with the PUSCH transmission bandwidth. In addition, an enhanced reference signal may be formed so that the sequence of the base reference signal is allocated to the field of the PUSCH transmission bandwidth, and a copy of the sequence of the base reference signal is allocated to a field not overlapping with the PUSCH transmission bandwidth.

The sequence of an enhanced reference signal (and the sequence of the base reference signal) may be generated from a sequence that extends over a wide band (for example, the system band). For example, a UE may transmit a portion of the above sequence that extends over a wide band (for example, the portion corresponding to the PUSCH bandwidth) in the event a reference signal is not extended (that is, when the base reference signal is transmitted within the PUSCH bandwidth), or the UE may transmit the whole of the above-noted wide-band sequence in the event a reference signal is extended (that is, when the base reference signal is transmitted beyond the PUSCH bandwidth). According to such a configuration, for example, an uplink reference signal and a downlink reference signal can be generated from a sequence that extends over the same wide band, so that interference between these reference signals can be reduced relatively easily.

The transmission bandwidth of an enhanced reference signal may be reported (indicated) in a UL grant. In this case, the PUSCH bandwidth and the bandwidth of the enhanced reference signal may be reported separately in the UL grant. The UE may transmit the PUSCH and the enhanced reference signal according to each bandwidth. In addition, the transmission bandwidth of an enhanced reference signal may be reported through higher layer signaling (for example, RRC signaling) or may be stipulated in the specification.

Note that the transmission bandwidth of an enhanced reference signal may be reported in the form of a value that incorporates the PUSCH bandwidth (for example, the sum of the transmission bandwidth of the enhanced reference signal and the PUSCH bandwidth), or may be reported as a value that does not incorporate the PUSCH bandwidth (for example, a value that is given by subtracting the PUSCH bandwidth from the transmission bandwidth of the enhanced reference signal).

The timing to transmit the enhanced reference signal may be reported in the UL grant, may be configured through higher layer signaling (for example, RRC signaling), or may be stipulated in the specification. The information of the transmission timing of the enhanced reference signal may be information to command transmission a predetermined period of time after (for example, four subframes after) a predetermined signal (for example, a UL grant), or may be information to indicate the transmission cycle or the timing offset (which is, for example, a subframe offset) of the enhanced reference signal.

For example, the enhanced reference signal's transmission bandwidth and transmission timing may be both reported in a UL grant. In addition, when the transmission bandwidth of the enhanced reference signal is determined in advance through higher layer signaling or in the specification, the transmission timing alone may be reported in a UL grant. The UE may transmit the enhanced reference signal according to the report, the configuration or the stipulated transmission timing.

When the correspondence/relationship between the candidates of the transmission band and/or the transmission timing of the enhanced reference signal and predetermined indices are reported through higher layer signaling (for example, RRC signaling) or stipulated in the specification, the UE may determine the transmission bandwidth and/or the transmission timing of the enhanced reference signal based on indices that are reported, and the correspondence/relationship. These indices may be reported in DCI (for example, a UL grant), or may be reported via higher layer signaling (for example, RRC signaling).

When a plurality of predetermined reference signals (for example, DMRSs) are present (for example, when multiple symbols are present) within one transmission time interval (TTI), only the predetermined reference signal in a specific period (for example, a specific symbol) may be made an enhanced reference signal, or all of the predetermined reference signals may be made enhanced reference signals. Here, the TTI may refer to a period that corresponds to one or more subframes, one or more slots, one or more mini-slots, and so on.

In the case where only the reference signal of a specific period in one TTI is extended, this specific period may be reported to the UE through higher layer signaling (for example, RRC signaling), physical layer signaling (for example, DCI (UL grant, etc.) or a combination of these, or may be stipulated in the specification.

Note that an enhanced reference signal may be transmitted in a period not overlapping with a predetermined period (for example, a subframe, a slot, a mini-slot, etc.) where PUSCH transmission is scheduled by a UL grant (that is, in a period in which the PUSCH is not transmitted).

[Block-IFDMA]

The UE may allocate enhanced reference signals to non-continuous bands by applying block interleaved FDMA (B-IFDMA: Block Interleaved Frequency Division Multiple Access). B-IFDMA refers to a scheme in which, in a predetermined period (for example, a symbol), a transmission signal is distributed and placed in a plurality of blocks that are allocated at equal intervals in the frequency direction. Each block is comprised of a predetermined frequency field (which is, for example, one or more subcarriers, and may be also referred to as "block bandwidth").

Although, when B-IFDMA is used, PAPR (which may be referred to as "cubic metric") becomes larger than when DFT-S-OFDM is used, it is still possible to reduce the resources to use while suppressing the increase in PAPR, as compared with the case of using CP-OFDM.

Figure 3:
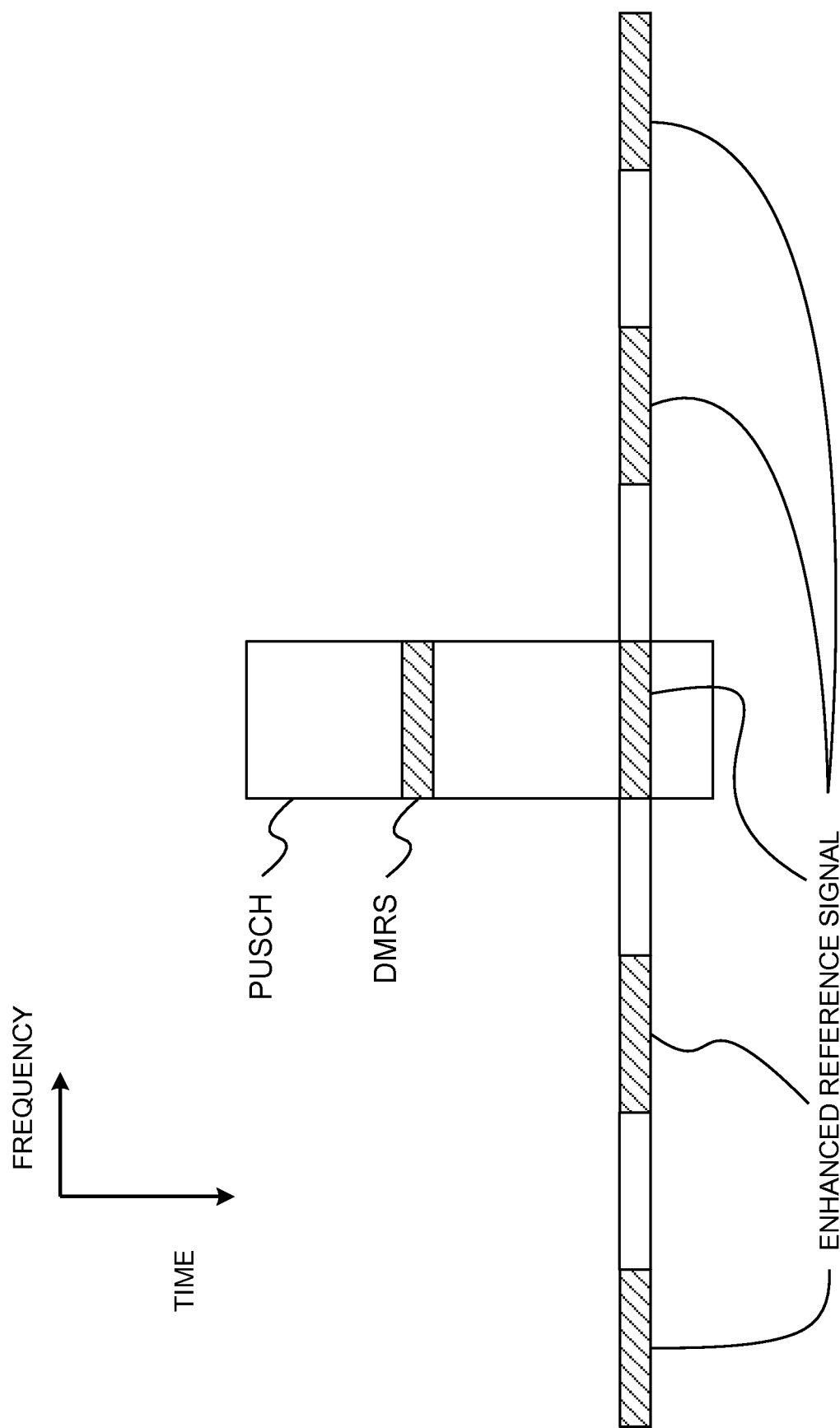
FIG. 3 is a diagram to show an example of transmitting enhanced reference signals in B-IFDMA.

FIG. 3 is a diagram to show an example of transmitting enhanced reference signals in B-IFDMA. An enhanced reference signal to be transmitted using B-IFDMA is allocated to a wider bandwidth than the PUSCH transmission bandwidth in a predetermined frequency band interval (which is, for example, an interval represented by a plurality of sub carriers, one or more RBs, etc., and may be referred to as "block interval"), and transmitted.

Information about the B-IFDMA patterns (for example, block bandwidth, block intervals, etc.) to apply to the enhanced reference signal may be reported (indicated) by a UL grant. In this case, the PUSCH bandwidth and the information about the B-IFDMA patterns may be reported separately in UL grants. The UE may transmit the enhanced reference signal using B-IFDMA, in accordance with the information about the B-IFDMA patterns. Also, the information about the B-IFDMA patterns may be reported through higher layer signaling, or may be stipulated in the specification (for example, RRC signaling).

The timing to transmit the enhanced reference signal using B-IFDMA may be reported in a UL grant, may be configured by higher layer signaling (for example, RRC signaling), or may be stipulated in the specification. For example, the B-IFDMA patterns and the transmission timing may be both reported in a UL grant. Furthermore, when the B-IFDMA patterns are determined in advance through higher layer signaling or in the specification, the transmission timing alone may be reported in a UL grant.

When the correspondence/relationship between the candidates for the B-IFDMA patterns and/or the transmission timing and predetermined indices are reported through higher layer signaling (for example, RRC signaling) or stipulated in the specification, the UE may determine the B-IFDMA patterns and/or the transmission timing based on indices that are reported, and the correspondence/relationship. These indices may be reported in DCI (for example, a UL grant) or may be reported via higher layer signaling (for example, RRC signaling).

[Determining the Transmission Power of Enhanced Reference Signals]

Next, the method of determining the transmission power of enhanced reference signals will be described. First, the uplink transmission power control in existing LTE will be described.

Figure 4:
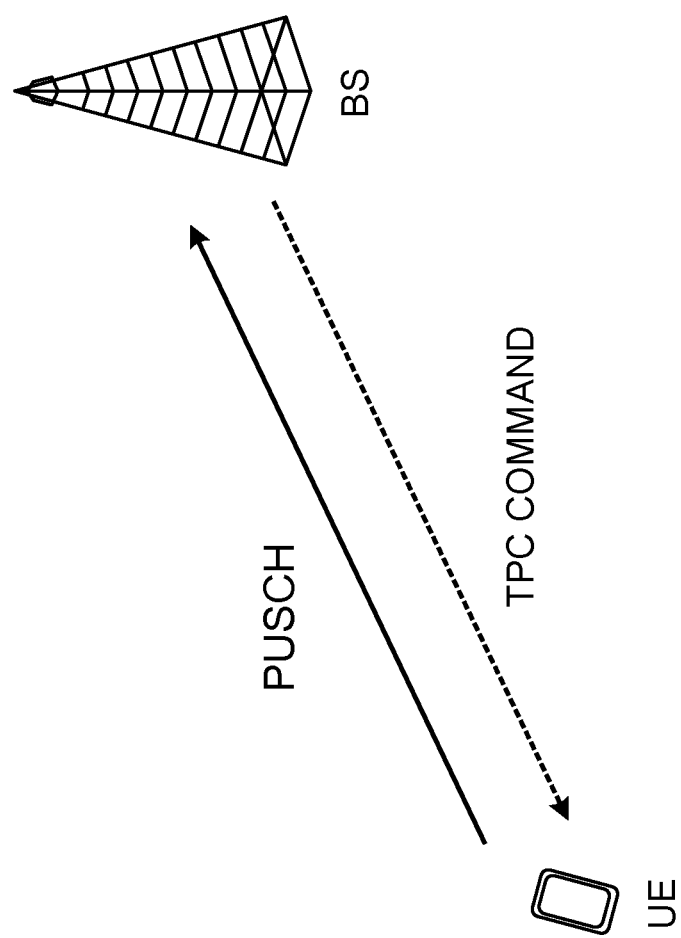
FIG. 4 is a diagram to show an example of transmission power control in existing LTE.

FIG. 4 is a diagram to show an example of transmission power control in existing LTE. In the uplink transmission power control of LTE (transmission power control for the PUSCH in FIG. 4), the error due to open-loop control is corrected by closed-loop control using transmission power control (TPC) commands that are received from the base stations.

In existing LTE, the transmission power $P_{PUSCH,c}(i)$ of the PUSCH in a subframe i of a serving cell c can be represented by, for example, following equation 1:

$$P_{PUSCH,c}(i) = \min\begin{Bmatrix} P_{CMAX,c}(i), \\ 10\log_{10}(M_{PUSH,c}(i)) + P_{O\_PUSCH,c}(j) + \\ \alpha_c(j) \cdot PL_c + \Delta_{TF,c}(i) + f_c(i) \end{Bmatrix} \quad \text{(Equation 1)}$$

In equation 1, $P_{CMAX,c}(i)$ is the maximum possible transmission power (maximum allowable transmission power) of a UE in cell c, $M_{PUSCH,c}(i)$ is the transmission bandwidth (the number of resource blocks) of the PUSCH, j is the index to represent the scheduling type of the PUSCH, $P_{O\_PUSCH,c}(j)$ is the value to indicate the target received power of the PUSCH, $\alpha_c(j)$ is the coefficient to multiply $PL_c$ by, $PL_c$ is the downlink path loss calculated by the UE, $\Delta_{TF,c}(i)$ is the offset value according to the transmission format, $f_c(i)$ is the correction value based on TPC commands (for example, a cumulative value of TPC commands, a TPC command-based offset amount, etc.). For example, $P_{O\_PUSCH,c}(j)$, $\alpha_c(j)$ and so on may be reported via broadcast information.

In equation 1, parameters that relate to open loop control include $M_{PUSCH,c}(i)$, $P_{O\_PUSCH,c}(j)$, $\alpha_c(j)$, $PL_c$ and $\Delta_{TF,c}(i)$. Furthermore, $f_c(i)$ is a parameter related to closed loop control. That is, the transmission power of the PUSCH is determined based on open loop control and closed loop control, such that the maximum possible transmission power of the UE is the upper limit. Also, the transmission power of the DMRS is preferably the same as the transmission power of the PUSCH.

In existing LTE, the transmission power $P_{SRS,c}(i)$ of the SRS in subframe i of serving cell c can be represented by, for example, following equation 2:

$$P_{SRS,c}(i) = \min\{P_{CMAX,c}(i), P_{SRS\_OFFSET,c}(m) + 10\log_{10}(M_{SRS,c}) + P_{O\_PUSCH,c}(j) + \alpha_c(j) \cdot PL_c + f_c(i)\} \quad \text{(Equation 2)}$$

In equalization 2, $P_{SRS\_OFFSET,c}(m)$ is the offset that is configured by higher layer signaling, $M_{SRS,c}(i)$ is the transmission bandwidth (the number of resource blocks) of the SRS, and the rest of the parameters are the same as in equation 1. In this way, existing SRS transmission power is calculated apart from the PUSCH transmission power.

In the first embodiment, a UE may determine the transmission power of an enhanced reference signal based on PUSCH transmission power. For example, the UE may adjust the transmission power of the enhanced reference signal based on the transmission bandwidth so that the power density of the transmission power of the enhanced reference signal is the same as the power density of the PUSCH transmission power (or the PUSCH transmission power with an offset). Also, the UE may decide the transmission power of the enhanced reference signal apart from the PUSCH transmission power.

Since an enhanced reference signal stretches over a wider band than the PUSCH does, the transmission power of the enhanced reference signal may reach the maximum possible transmission power (for example, the maximum possible transmission power per CC) before the PUSCH transmission power does. When the transmission power of an enhanced reference signal reaches the maximum possible transmission power, the UE may or may not raise the PUSCH transmission power to the maximum possible transmission power (for example, the UE may keep the PUSCH transmission power at the transmission power found in equation 1). In the former case, the received quality of the PUSCH can be improved, and, in the latter case, the relative power of the enhanced reference signal and the PUSCH can be kept constant.

[Power Headroom when Enhanced Reference Signal is Used]

In existing LTE systems, a base station calculates the path loss based on power headroom (also referred to as "power headroom (PH)," "UPH (UE power headroom)," etc.) reported from UEs, and selects TPC commands. A UE transmits the UPH in a power headroom report (PHR).

When an enhanced reference signal is used, the UE may calculate the UPH based on the PUSCH transmission power and/or the PUSCH transmission bandwidth, or based on the transmission power of the enhanced reference signal and/or the transmission bandwidth of the enhanced reference signal.

[Precoding of Enhanced Reference Signals]

Enhanced reference signals are preferably transmitted without being subjected to precoding. This is because precoded signals yield channel measurement results that are different from pure channel measurement results, due to the influence of precoding.

Figure 5A:
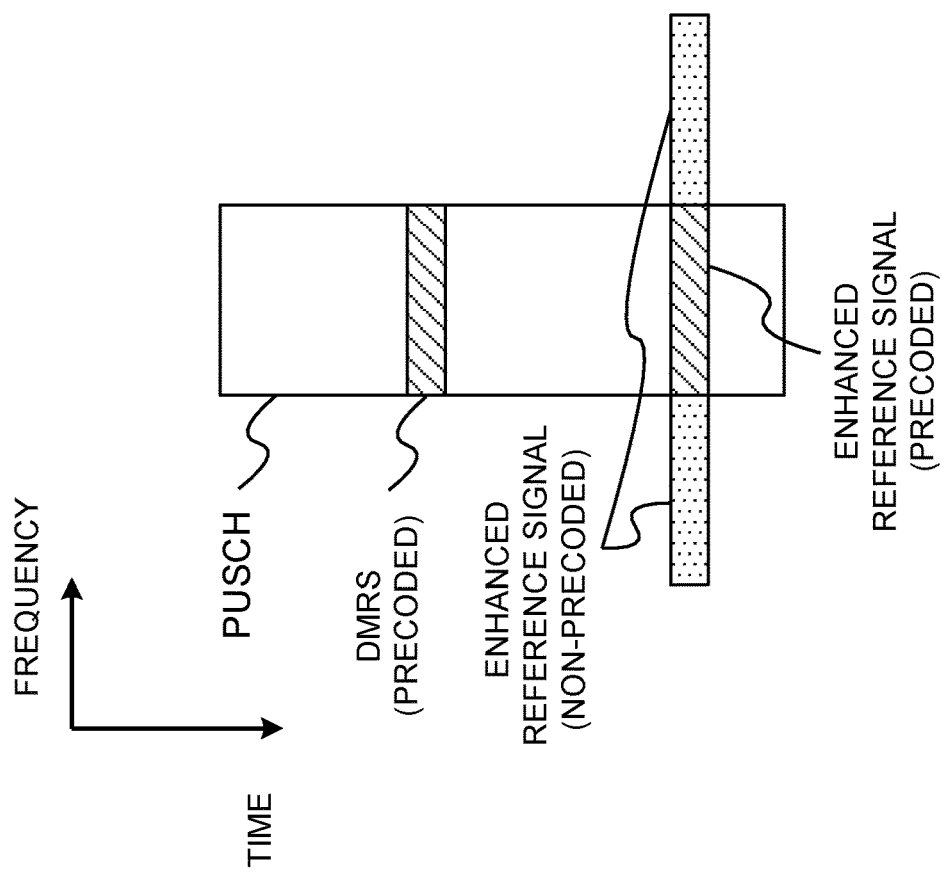
FIG. 5A and FIG. 5B are diagrams to show examples of whether or not precoding is applied to an enhanced reference signal.
Figure 5B:
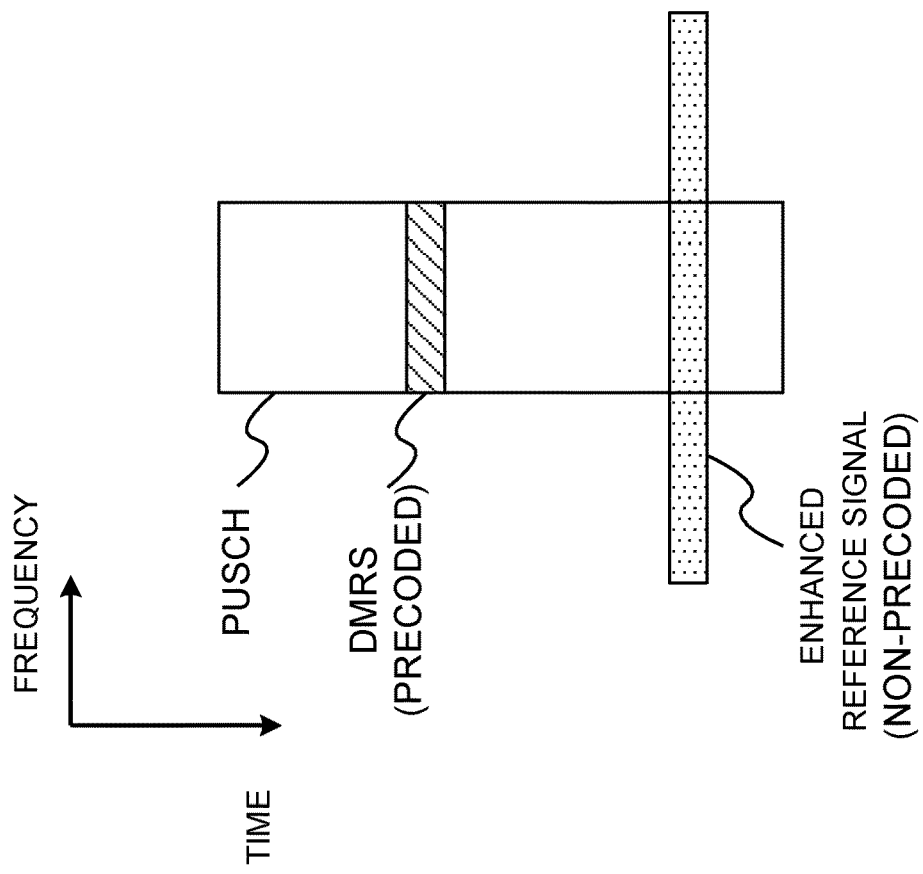

FIG. 5A and FIG. 5B are diagrams to show examples in which precoding is applied/not applied to enhanced reference signals. As shown in FIG. 5A, although, when the PUSCH is precoded, the DMRS is likely to be precoded as well, even when the DMRS is precoded, the enhanced reference signal needs not be precoded.

It is also possible to employ a structure in which enhanced reference signals in some bands are precoded, while enhanced reference signals in other bands are not precoded. For example, referring to FIG. 5B, a structure may be employed in which enhanced reference signals in a frequency band that overlaps the band in which the PUSCH is transmitted are precoded, while enhanced reference signals that are transmitted in bands apart from the PUSCH-transmitting band are not precoded.

Whether or not precoding is applied to enhanced reference signals—that is, "ON (precoding is applied (precoded))" and/or "OFF (precoding is not applied (non-precoded))" of precoding—may be reported to the UE through higher layer signaling (for example, RRC signaling), physical layer signaling (for example, DCI (UL grant, etc.)) or a combination these, or may be stipulated in the specification.

According to the first embodiment described above, uplink channel measurements can be realized with low overhead by using enhanced reference signals that are different from the existing SRS.

Second Embodiment

According to a second embodiment of the present invention, a base station determines scheduling (for example, resource allocation) in DFT-S-OFDM based on measurement reference signals (or their measurement results) transmitted from UEs by CP-OFDM. In this case, it is not necessary to transmit measurement reference signals using DFT-S-OFDM, so that the overhead in transmitting existing SRSs by DFT-S-OFDM can be reduced.

According to the second embodiment, a UE may transmit existing SRSs, or transmit enhanced reference signals such as those described with the first embodiment, by using DFT-S-OFDM, or the UE may not transmit one or both of these.

The UE may transmit measurement reference signals that are allocated in the frequency domain in a discontinuous manner, by using CP-OFDM. By this means, the amount of resources to use for measurement reference signals can be reduced compared with existing LTE SRSs. Note that measurement reference signals to transmit in CP-OFDM may be transmitted in one or more symbols, or may be transmitted in periods shorter than one symbol.

Figure 6A:
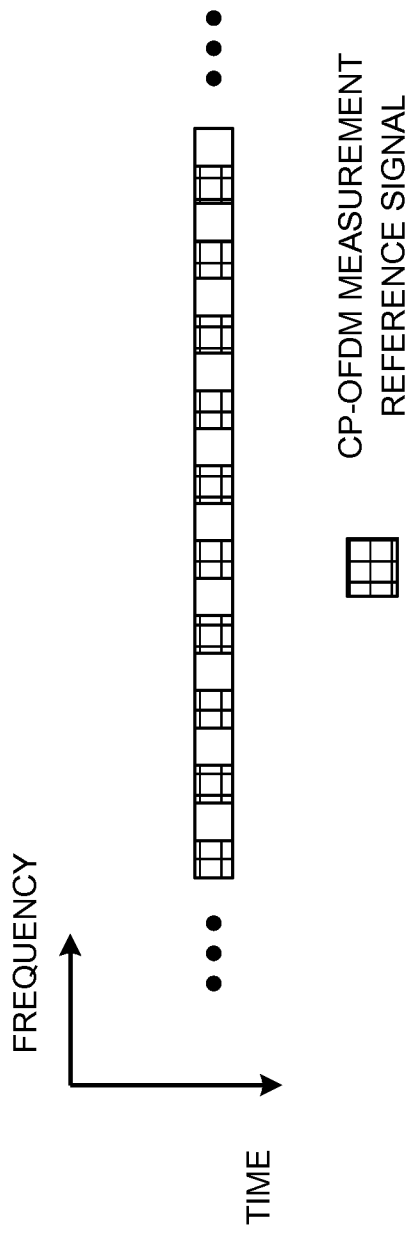
FIG. 6A and FIG. 6B are diagrams to show examples of measurement reference signals that are transmitted in CP-OFDM.
Figure 6B:
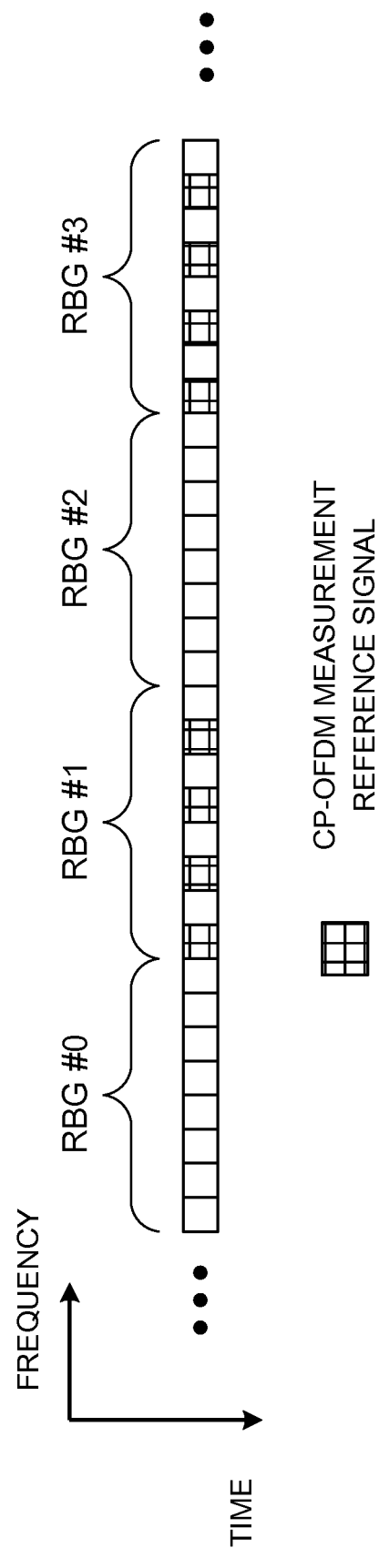

FIG. 6A and FIG. 6B are diagrams to show examples of measurement reference signals to transmit in CP-OFDM. For example, as shown in FIG. 6A, a UE may transmit measurement reference signals at predetermined frequency intervals (for example, at predetermined subcarrier intervals), by using CP-OFDM.

Also, as shown in FIG. 6B, when CP-OFDM is used, the UE may transmit measurement reference signals that are discontinuously arranged in predetermined frequency bandwidths (including, for example, a bandwidth corresponding to one or more sub-carriers, a bandwidth corresponding to one or more RBs, a bandwidth corresponding to one or more resource block groups (RBGs), etc.) at predetermined frequency intervals (for example, at predetermined RBG intervals). For example, in the example of FIG. 6B, among RBG #0 to #3, which are each comprised of eight RBs, measurement reference signals are discontinuously transmitted in RBG #1 and RBG #3, while no measurement reference signal is transmitted in RBG #0 and #2.

According to the second embodiment described above, it is possible to reduce the resources that are necessary to transmit measurement reference signals.

Variations

Note that, although, with the embodiments illustrated above, CP-OFDM and DFT-S-OFDM have been described as examples of waveforms for use by UEs, these are by no means limiting. For example, CP-OFDM may be referred to as "multi-carrier transmission scheme," and DFT-S-OFDM may be referred to as "single-carrier transmission scheme."

(Radio Communication System)

Now, the structure of the radio communication system according to one embodiment of the present invention will be described below. In this radio communication system, communication is performed using one of the radio communication methods according to the herein-contained embodiments of the present invention, or a combination of these.

Figure 7:
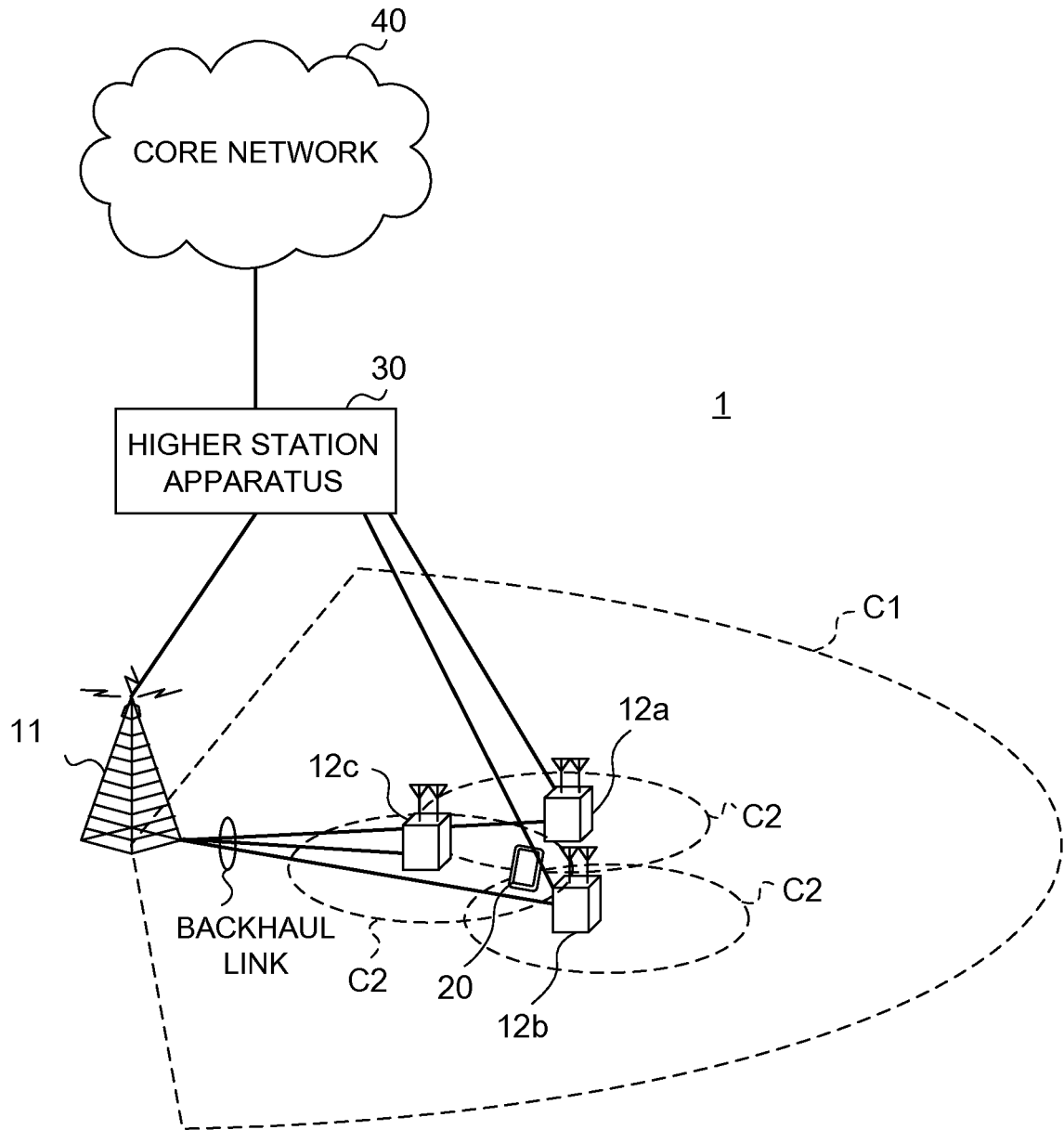
FIG. 7 is a diagram to show an example of a schematic structure of a radio communication system according to one embodiment of the present invention.

FIG. 7 is a diagram to show an example of a schematic structure of a radio communication system according to one embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "FRA (Future Radio Access)," "New-RAT (Radio Access Technology)" and so on, or may be seen as a system to implement these.

The radio communication system 1 includes a radio base station 11 that forms a macro cell C1, and radio base stations 12a to 12c that are placed within the macro cell C1 and that form small cells C2, which are narrower than the macro cell C1. Also, user terminals 20 are placed in the macro cell C1 and in each small cell C2. The arrangements and numbers of cells and user terminals 20 are not limited to those illustrated in the drawing.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, five or fewer CCs or six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNB s (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various transmission schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) and/or OFDMA are applied to the uplink.

OFDMA is a multi-carrier transmission scheme to perform communication by dividing a frequency bandwidth into a plurality of narrow frequency bandwidths (subcarriers) and mapping data to each subcarrier. SC-FDMA is a single-carrier transmission scheme to mitigate interference between terminals by dividing the system bandwidth into bandwidths formed with one or continuous resource blocks per terminal, and allowing a plurality of terminals to use mutually different bandwidths. Note that, uplink and downlink radio access schemes are not limited to these combinations, and other radio access schemes may be used.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. User data, higher layer control information SIBs (System Information Blocks) and so on are communicated in the PDSCH. Also, the MIB (Master Information Blocks) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), which includes PDSCH and/or PUSCH scheduling information, is communicated by the PDCCH. The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACKs," "ACK/NACKs," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. User data, higher layer control information and so on are communicated by the PUSCH. Also, downlink radio quality information (CQI: Channel Quality Indicator), delivery acknowledgement information and so on are communicated by the PUCCH. By means of the PRACH, random access preambles for establishing connections with cells are communicated.

In the radio communication system 1, cell-specific reference signals (CRSs), channel state information reference signals (CSI-RSs), demodulation reference signals (DMRSs), positioning reference signals (PRSs) and so on are communicated as downlink reference signals. Also, in the radio communication system 1, measurement reference signals (SRSs: Sounding Reference Signals), demodulation reference signals (DMRSs) and so on are communicated as uplink reference signals. Note that the DMRSs may be referred to as "user terminal-specific reference signals (UE-specific reference signals)." Also, the reference signals to be communicated are by no means limited to these.

(Radio Base Station)

Figure 8:
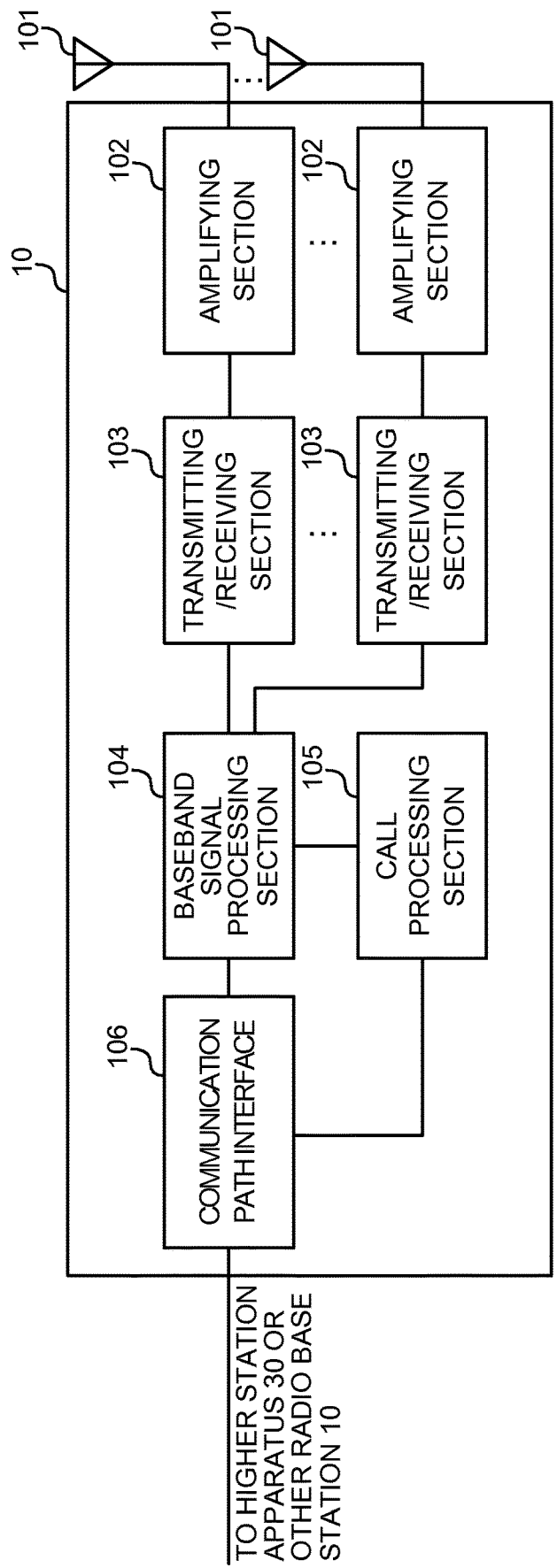
FIG. 8 is a diagram to show an example of an overall structure of a radio base station according to one embodiment of the present invention.

FIG. 8 is a diagram to show an example of an overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Note that the transmitting/receiving sections 103 may further have an analog beam forming section, which forms analog beams. The analog beam forming section can be constituted by an analog beam forming circuit (for example, a phase shifter, a phase shift circuit, etc.) or analog beam forming apparatus (for example, a phase shifting device) that can be described based on general understanding of the technical field to which the present invention pertains. Furthermore, the transmitting/receiving antennas 101 may be constituted by, for example, array antennas.

The transmitting/receiving sections 103 may transmit a downlink control signal (for example, DCI), which schedules the transmission of a data signal in accordance with the waveform of a first transmission scheme (for example, a single-carrier transmission scheme), to the user terminal 20. This downlink control signal may be a signal that is generated based on a measurement result of a measurement reference signal in accordance with a waveform that is based on a second transmission scheme (for example, a multi-carrier transmission scheme).

The transmitting/receiving sections 103 may receive the waveform based on the first transmission scheme and/or the waveform based on the second transmission scheme, from the user terminal 20. Using the first transmission scheme, the transmitting/receiving sections 103 may receive measurement reference signals that are different from the existing LTE SRS and that have a wider transmission bandwidth than the above-noted data signal. Also, the transmitting/receiving sections 103 may receive measurement reference signals using the second transmission scheme. Also, the transmitting/receiving sections 103 may receive the PHR and so on.

Furthermore, the transmitting/receiving sections 103 may transmit information about the transmission bandwidth of enhanced reference signals, information about the transmission timing of enhanced reference signals, information about the B-IFDMA patterns to apply to enhanced reference signals, and so on.

Figure 9:
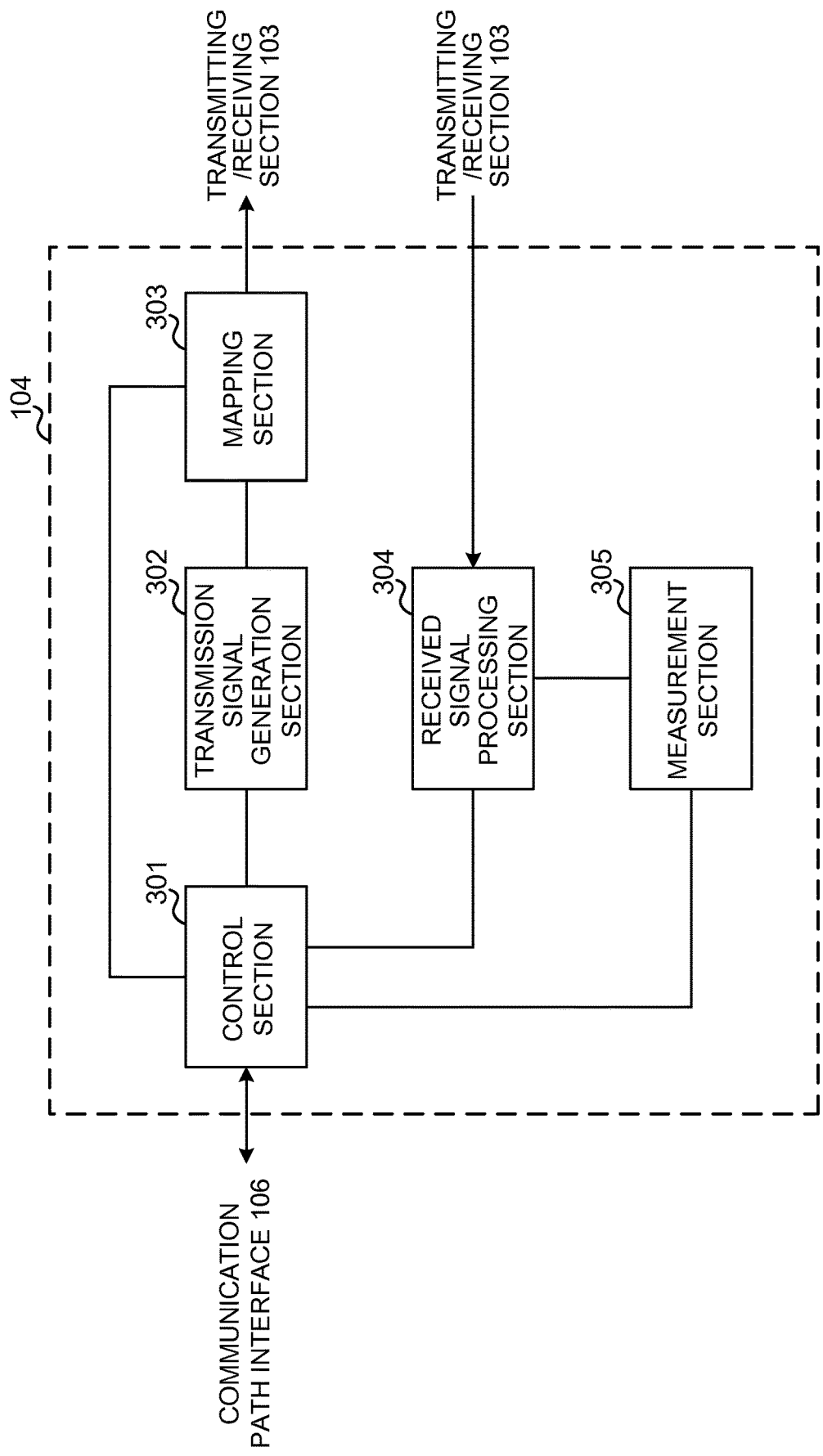
FIG. 9 is a diagram to show an example of a functional structure of a radio base station according to one embodiment of the present invention.

FIG. 9 is a diagram to show an example of a functional structure of a radio base station according to one embodiment of the present invention. Note that, although this example primarily shows functional blocks that pertain to characteristic parts of the present embodiment, the radio base station 10 has other functional blocks that are necessary for radio communication as well.

The baseband signal processing section 104 has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301 controls, for example, the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of system information, downlink data signals (for example, signals that are transmitted in the PDSCH), downlink control signals (for example, signals that are transmitted in the PDCCH and/or the EPDCCH, delivery acknowledgment information, and so on). The control section 301 controls the generation of downlink control signals, downlink data signals and so on, based on the results of deciding whether or not retransmission control is necessary for uplink data signals, and so on. Also, the control section 301 controls the scheduling of synchronization signals (for example, the PSS (Primary Synchronization Signal)/SSS (Secondary Synchronization Signal)), downlink reference signals (for example, the CRS, the CSI-RS, the DMRS, etc.) and so on.

In addition, the control section 301 controls the scheduling of uplink data signals (for example, signals that are transmitted in the PUSCH) uplink control signals (for example, signals that are transmitted in the PUCCH and/or the PUSCH, including delivery acknowledgment information, and/or the like), random access preambles (for example, signals that are transmitted in the PRACH), uplink reference signals, and so on.

The control section 301 may exert control so that transmitting beams and/or receiving beams are formed using the digital BF (for example, precoding) by the baseband signal processing section 104 and/or the analog BF (for example, phase rotation) by the transmitting/receiving sections 103. The control section 301 may exert control so that beams are formed based on downlink transmission path information, uplink transmission path information, and so on. These pieces of information about transmission paths may be obtained from the received signal processing section 304 and/or the measurement section 305. Note that transmission using transmission beams may be paraphrased as transmission of signals to which predetermined precoding is applied.

The control section 301 exerts control so that at least signals that are based on the first transmission scheme (for example, a single-carrier transmission scheme, DFT-S-OFDM, etc.) are received via the uplink. The control section 301 may also exert control so that signals based on the second transmission scheme (for example, a multi-carrier transmission scheme, CP-OFDM, etc.) are received via the uplink.

The control section 301 may exert control so that a downlink control signal (for example, DCI (UL grant)) to schedule the transmission of a data signal (for example, a signal to transmit in the PUSCH) in accordance with the waveform based on the first transmission scheme (for example, a single-carrier transmission scheme) is transmitted.

The control section 301 may exert control so that measurement reference signals (enhanced reference signals), which are different from the uplink sounding reference signals (SRSs) of existing LTE (for example, LTE Rel. 13) and which have a wider transmission bandwidth than the above-noted data signal, are received and measured assuming the waveform based on the first transmission scheme (for example, a single-carrier transmission scheme).

The control section 301 may exert control so that enhanced reference signals are received and measured as reference signals that share at least some of the resources with the demodulation reference signals (DMRSs) used in existing LTE. Note that the enhanced reference signals may be reference signals to share at least part of the resources with CSI-RSs, BRSs, PT-RSs and so on.

When enhanced reference signals are used, the control section 301 may assume that the UPH is calculated based on the transmission power of the above-noted data signal and/or the transmission bandwidth of the above-noted data signal, or assume that the UPH is calculated based on the transmission power of enhanced reference signals and/or the transmission bandwidth of enhanced reference signals.

The control section 301 may assume that precoding is applied to some or all enhanced reference signals, or assume that precoding is not applied.

The control section 301 may exert control so that reception and measurements are performed assuming that measurement reference signals based on the second transmission scheme (for example, a multi-carrier transmission scheme) are allocated in a discontinuous manner in the frequency domain and transmitted. The control section 301 may exert control so that the scheduling of uplink data transmission in the user terminal 20 is determined based on the measurement results of these measurement reference signals, and downlink control signals (for example, DCI (UL grant)) for scheduling the transmission of data signals having the waveform based on the first transmission scheme (for example, a single-carrier transmission scheme) are transmitted.

The control section 301 may estimate the path loss pertaining to a predetermined waveform of the user terminal 20 based on the received PHR, and determine the TPC command to transmit to the user terminal 20 based on this path loss.

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink data allocation information, and/or UL grants, which report uplink data allocation information, based on commands from the control section 301. DL assignments and UL grants are both DCI, in compliance with DCI format. Also, downlink data signals are subjected to the coding process, the modulation process and so on, by using coding rates and modulation schemes that are determined based on, for example, channel state information (CSI) that is reported from each user terminal 20.

The mapping section 303 maps the downlink signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminal 20 (uplink control signals, uplink data signals, uplink reference signals, etc.). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes to the control section 301. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signals. For example, the measurement section 305 may measure enhanced reference signals that are transmitted using the first transmission scheme, or measure measurement reference signals that are transmitted using the second transmission scheme. The measurement section 305 can be constituted by a measurer, a measurement circuit or measurement apparatus that can be described based on general understanding of the technical field to which the present invention pertains.

For example, the measurement section 305 may perform RRM (Radio Resource Management) measurements, CSI (Channel State Information) measurements and so on, based on the received signals. The measurement section 305 may measure the received power (for example, RSRP (Reference Signal Received Power)), the received quality (for example, RSRQ (Reference Signal Received Quality), SINR (Signal to Interference plus Noise Ratio), etc.), the signal strength (for example, RSSI (Received Signal Strength Indicator)), trans mission path information (for example, CSI), and so on. The measurement results may be output to the control section 301.

(User Terminal)

Figure 10:
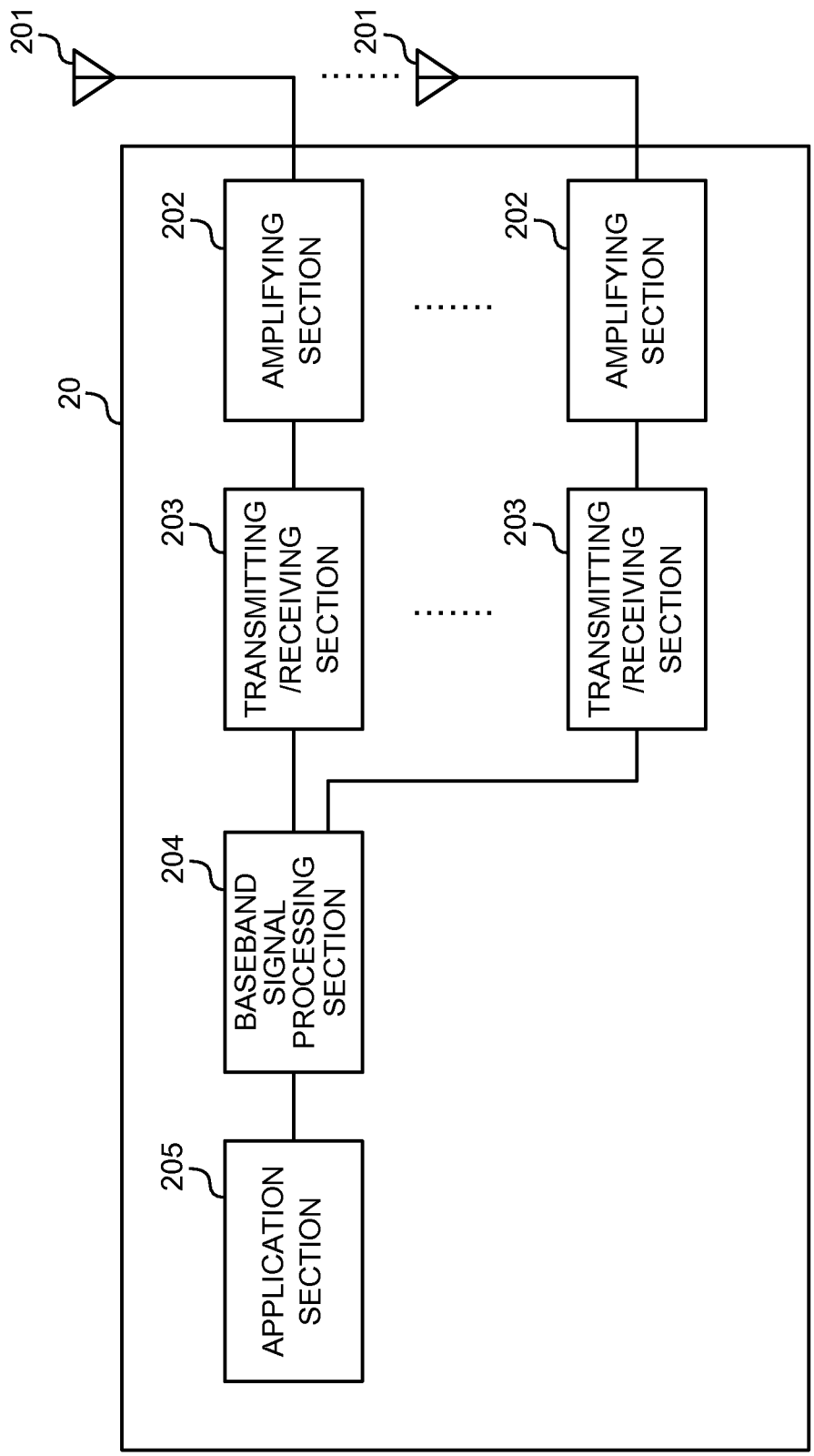
FIG. 10 is a diagram to show an example of an overall structure of a user terminal according to one embodiment of the present invention.

FIG. 10 is a diagram to show an example of an overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

The baseband signal processing section 204 performs receiving processes for the baseband signal that is input, including an FFT process, error correction decoding, a retransmission control receiving process and so on. Downlink user data is forwarded to the application section 205. The application section 205 performs processes related to higher layers above the physical layer and the MAC layer, and so on. In the downlink data, the broadcast information can be also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Note that the transmitting/receiving sections 203 may furthermore have an analog beam forming section that forms analog beams. The analog beam forming section may be constituted by an analog beam forming circuit (for example, a phase shifter, a phase shifting circuit, etc.) or analog beam forming apparatus (for example, a phase shifting device) that can be described based on general understanding of the technical field to which the present invention pertains. Furthermore, the transmitting/receiving antennas 201 may be constituted by, for example, array antennas.

The transmitting/receiving sections 203 may receive a downlink control signal (for example, DCI), which schedules the transmission of data signals in accordance with the waveform of a first transmission scheme (for example, a single-carrier transmission scheme), from the radio base station 10. This downlink control signal may be a signal that is generated based on a measurement result of a measurement reference signal in accordance with a waveform that is based on a second transmission scheme (for example, a multi-carrier transmission scheme).

The transmitting/receiving sections 203 may transmit the waveform based on the first transmission scheme and/or the waveform based on the second transmission scheme to the radio base station 10. Using the first transmission scheme, the transmitting/receiving sections 203 may transmit measurement reference signals that are different from the existing LTE SRS and that have a wider transmission bandwidth than the above-noted data signal. Also, the transmitting/receiving sections 203 may transmit measurement reference signals using the second transmission scheme.

The transmitting/receiving sections 203 may apply precoding to the demodulation reference signals for demodulating data signals, and not apply precoding to the above-noted measurement reference signals having a wide transmission bandwidth. Also, the transmitting/receiving sections 203 may transmit the PHR and so on.

Furthermore, the transmitting/receiving sections 203 may transmit information about the transmission bandwidth of enhanced reference signals, information about the transmission timing of enhanced reference signals, information about the B-IFDMA patterns to apply to enhanced reference signals, and so on.

Figure 11:
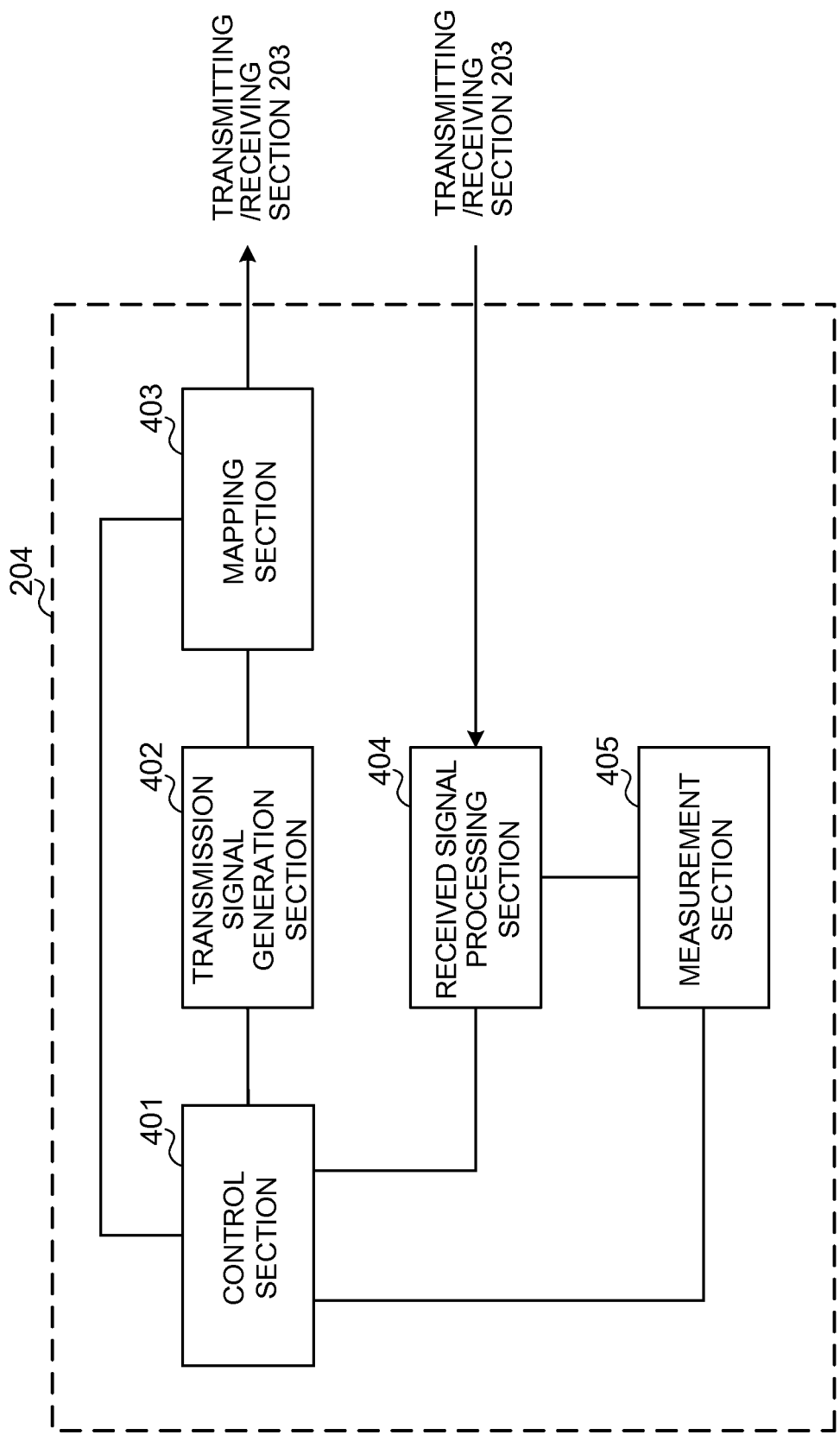
FIG. 11 is a diagram to show an example of a functional structure of a user terminal according to one embodiment of the present invention.

FIG. 11 is a diagram to show an example of a functional structure of a user terminal according to one embodiment of the present invention. Note that, although this example primarily shows functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. The control section 401 can be constituted by a controller, a control circuit or control apparatus that can be described based on general understanding of the technical field to which the present invention pertains.

The control section 401, for example, controls the generation of signals in the transmission signal generation section 402, the allocation of signals by the mapping section 403, and so on. Furthermore, the control section 401 controls the signal receiving processes in the received signal processing section 404, the measurements of signals in the measurement section 405, and so on.

The control section 401 acquires the downlink control signals and downlink data signals transmitted from the radio base station 10, via the received signal processing section 404. The control section 401 controls the generation of uplink control signals and/or uplink data signals based on the results of deciding whether or not retransmission control is necessary for the downlink control signals and/or downlink data signals, and so on.

The control section 401 may exert control so that transmitting beams and/or receiving beams are formed using the digital BF (for example, precoding) by the baseband signal processing section 204 and/or the analog BF (for example, phase rotation) by the transmitting/receiving sections 203. The control section 401 may exert control so that beams are formed based on downlink transmission path information, uplink transmission path information, and so on. These pieces of information about transmission paths may be obtained from the received signal processing section 404 and/or the measurement section 405.

The control section 401 exerts control so that at least signals that are based on the first transmission scheme (for example, a single-carrier transmission scheme, DFT-S-OFDM, etc.) are transmitted via the uplink. The control section 401 may also exert control so that signals based on the second transmission scheme (for example, a multi-carrier transmission scheme, CP-OFDM, etc.) are transmitted via the uplink.

The control section 401 may exert control so that, when a downlink control signal (for example, DCI (UL grant)) to schedule the transmission of a data signal (for example, a signal to transmit in the PUSCH) in accordance with the waveform based on the first transmission scheme (for example, a single-carrier transmission scheme) is acquired from the received signal processing section 404, the data signal is transmitted at a predetermined timing.

The control section 401 may exert control so that sounding reference signals (enhanced reference signals), which are different from the uplink sounding reference signals (SRSs) of existing LTE (for example, LTE Rel. 13) and which have a wider transmission bandwidth than the above-noted data signal, are transmitted using the waveform based on the first transmission scheme (for example, a single-carrier transmission scheme).

The control section 401 may exert control so that enhanced reference signals are generated and transmitted as reference signals that share at least some of the resources with the demodulation reference signals (DMRSs) used in existing LTE. Note that the enhanced reference signals may be reference signals to share at least part of the resources with CSI-RSs, BRSs, PT-RSs and so on.

The control section 401 may determine the transmission power of the enhanced reference signals based on the transmission power of the above-noted data signal, or apart from the transmission power of the above-noted data signal.

When enhanced reference signals are used, the control section 401 may calculate the UPH based on the transmission power of the above-noted data signal and/or the transmission bandwidth of the above-noted data signal, or the control section 401 may calculate the UPH based on the transmission power of the enhanced reference signals and/or the transmission bandwidth of the enhanced reference signals.

The control section 401 may exert control so that precoding is applied to the demodulation reference signal (DMRS) for the above-noted data signal, and not applied to the enhanced reference signals.

The control section 401 may exert control so that reference signals based on the second transmission scheme (for example, multi-carrier transmission scheme) are allocated in a discontinuous manner in the frequency domain and transmitted. The control section 401 may exert control so that, when a downlink control signal (for example, DCI (UL grant)) that is generated in the radio base station 10 based on the measurements results of the measurement reference signals and that schedules the transmission of a data signal in accordance with the waveform based on the first transmission scheme (for example, a single-carrier transmission scheme) is received, the data signal is transmitted using the first transmission scheme, based on the downlink control signal.

In addition, when various pieces of information reported from the radio base station 10 are acquired from the received signal processing section 404, the control section 401 may update the parameters used for control based on the information.

The transmission signal generation section 402 generates uplink signals (uplink control signals, uplink data signals, uplink reference signals, etc.) based on commands from the control section 401, and outputs these signals to the mapping section 403. The transmission signal generation section 402 can be constituted by a signal generator, a signal generating circuit or signal generation apparatus that can be described based on general understanding of the technical field to which the present invention pertains.

For example, the transmission information generation section 402 generates uplink control signals such as delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and output the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information that is acquired through the receiving processes to the control section 401. The received signal processing section 404 outputs, for example, broadcast information, system information, RRC signaling, DCI and so on, to the control section 401. Also, the received signal processing section 404 outputs the received signals and/or the signals after the receiving processes to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

For example, the measurement section 405 may perform RRM measurements, CSI measurements, and so on, based on the received signals. The measurement section 405 may measure the received power (for example, RSRP), the received quality (for example, RSRQ, SINR, etc.), the signal strength (for example, RSSI), transmission path information (for example, CSI), and so on. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 12:
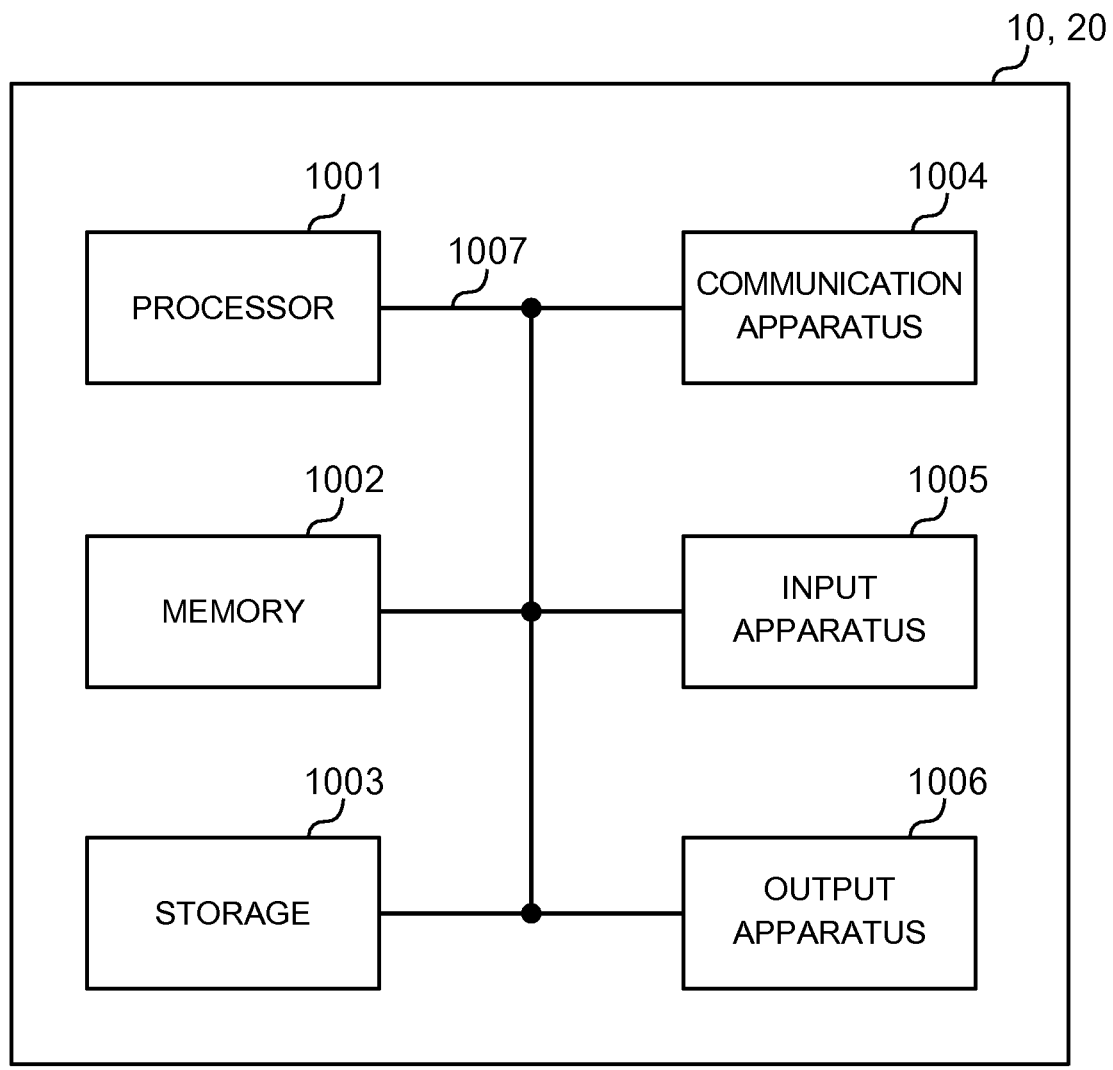
FIG. 12 is a diagram to show an example hardware structure of a radio base station and a user terminal according to one embodiment of the present invention.

For example, the radio base stations, user terminals and so according to the embodiments of the present invention may function as a computer that executes the processes of the radio communication method of the present invention. FIG. 12 is a diagram to show an example hardware structure of a radio base station and a user terminal according to one embodiment of the present invention. Physically, a radio base station 10 and a user terminal 20, which have been described above, may be formed as computer apparatus that includes a processor 1001, a memory 1002, a storage 1003, communication apparatus 1004, input apparatus 1005, output apparatus 1006, a bus 1007 and so on.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on two or more processors. Note that the processor 1001 may be implemented with one or more chips.

Each function of the radio base station 10 and the user terminal 20 is implemented by reading predetermined software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow the computer to execute at least part of the operations of the above-described embodiments may be used. For example, the control section 401 of the user terminal 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory (primary storage apparatus)" and so on. The memory 1002 can store executable programs (program codes), software modules and/or the like for implementing the radio communication methods according to embodiments of the present invention.

The storage 1003 is a computer-readable recording medium, and may be constituted by, for example, at least one of a flexible disk, a floppy (registered trademark) disk, an opto-magneic disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as a "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD: Frequency Division Duplex) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one piece of these hardware.

(Variations)

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Further, a subframe may be comprised of one or more slots in the time domain. A subframe may be a fixed time duration (for example, one ms) not dependent on the neurology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on neurology. Also, a slot may include a plurality of mini-slots. Each mini-slot may consist of one or more symbols in the time domain. Also, a mini-slot may be referred to as a "subslot."

A radio frame, a subframe, a slot, a mini-slot and a symbol all represent the time unit in signal communication. A radio frame, a subframe, a slot, a mini-slot and a symbol may be each called by other applicable names. For example, one subframe may be referred to as a "transmission time interval (TTI)," or a plurality of consecutive subframes may be referred to as a "TTI," or one slot or mini-slot may be referred to as a "TTI." That is, a subframe and/or a TTI may be a subframe (one ms) in existing LTE, may be a shorter period than one ms (for example, one to thirteen symbols), or may be a longer period of time than one ms. Note that the unit to represent the TTI may be referred to as a "slot," a "mini slot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that when a TTI is given, the time interval (for example, the number of symbols) in which transport blocks, code blocks and/or codewords are actually mapped may be shorter than the TTI.

Note that, when one slot or one mini-slot is referred to as a "TTI," one or more TTIs (that is, one or more slots or one or more mini-slots) may be the minimum time unit of scheduling. Also, the number of slots (the number of mini-slots) to constitute this minimum time unit of scheduling may be controlled.

A TTI having a time duration of one ms may be referred to as a "normal TTI (TTI in LTE Rel. 8 to 12)," a "long TTI," a "normal subframe," a "long subframe," and so on. A TTI that is shorter than a normal TTI may be referred to as a "shortened TTI," a "short TTI," "a partial TTI (or a "fractional TTI"), a "shortened subframe," a "short subframe," a "mini-slot," "a sub-slot" and so on.

Note that a long TTI (for example, a normal TTI, a subframe, etc.) may be replaced with a TTI having a time duration exceeding one ms, and a short TTI (for example, a shortened TTI) may be replaced with a TTI having a TTI length less than the TTI length of a long TTI and not less than one ms.

A resource block (RB) is the unit of resource allocation in the time domain and the frequency domain, and may include one or a plurality of consecutive subcarriers in the frequency domain. Also, an RB may include one or more symbols in the time domain, and may be one slot, one mini-slot, one subframe or one TTI in length. One TTI and one subframe each may be comprised of one or more resource blocks. Note that one or more RBs may be referred to as a "physical resource block (PRB: Physical RB)," a "subcarrier group (SCG: Sub-Carrier Group)," a "resource element group (REG)," an "PRB pair," an "RB pair" and so on.

Furthermore, a resource block may be comprised of one or more resource elements (REs). For example, one RE may be a radio resource field of one subcarrier and one symbol.

Note that the structures of radio frames, subframes, slots, mini-slots, symbols and so on described above are merely examples. For example, configurations pertaining to the number of subframes included in a radio frame, the number of slots included in a subframe, the number of mini-slots included in a slot, the number of symbols and RBs included in a slot or a mini-slot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control Channel), PDCCH (Physical Downlink Control Channel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and output via a plurality of network nodes.

The information, signals and so on that are input and/or output may be stored in a specific place (for example, a memory), or may be managed using a management table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the examples/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs: Remote Radio Heads)). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "radio communication device," "remote device," "mobile subscriber station," "access terminal," "mobile terminal," "wireless terminal," "remote terminal," "handset," "user agent," "mobile client," "client" or some other suitable terms.

Further, the radio base stations in this specification may be interpreted as user terminals. For example, each aspect/embodiment of the present invention may be applied to a configuration in which communication between a radio base station and a user terminal is replaced with communication among a plurality of user terminals (D2D: Device-to-Device). In this case, user terminal 20 may have the functions of the radio base station 10 described above. In addition, terms such as "uplink" and "downlink" may be interpreted as "side." For example, an uplink channel may be interpreted as a side channel.

Likewise, the user terminals in this specification may be interpreted as radio base stations. In this case, the radio base station 10 may have the functions of the user terminal 20 described above.

Certain actions which have been described in this specification to be performed by base station may, in some cases, be performed by upper nodes. In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The examples/embodiments illustrated in this specification may be used individually or in combinations, which may be switched depending on the mode of implementation. The order of processes, sequences, flowcharts and so on that have been used to describe the examples/embodiments herein may be re-ordered as long as inconsistencies do not arise. For example, although various methods have been illustrated in this specification with various components of steps in exemplary orders, the specific orders that are illustrated herein are by no means limiting.

The examples/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate systems and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method for distinguishing between two or more elements. Thus, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure, ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination thereof. For example, "connection" may be read as "access." As used herein, two elements may be considered "connected" or "coupled" to each other by using one or more electrical wires, cables and/or printed electrical connections, and, as a number of non-limiting and non-inclusive examples, by using electromagnetic energy having wavelengths in radio frequency regions, microwave regions and/or optical regions (both visible and invisible).

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining example s, and should by no means be construed to limit the present invention in any way.

The disclosure of Japanese Patent Application No. 2016-247586, filed on Dec. 21, 2016, including the specification, drawings and abstract, is incorporated herein by reference in its entirety.

The invention claimed is:

1. A terminal comprising:
a transmitter that transmits measurement reference signals that are allocated discretely at periodic subcarrier intervals across one or more frequency bandwidths, by using Cyclic Prefix Orthogonal Frequency Division Multiplexing (CP-OFDM); and
a processor that controls transmission of an uplink shared channel and a phase tracking reference signal,
wherein the processor controls to apply precoding to the phase tracking reference signal in a frequency band in which the uplink shared channel is transmitted, and not to apply precoding to a phase tracking reference signal in a frequency band other than the frequency band in which the uplink shared channel is transmitted.

2. The terminal according to claim 1, wherein the transmitter transmits the measurement reference signals periodically at a given cycle.

3. The terminal according to claim 1, wherein when transmission of the measurement reference signals is triggered by downlink control information (DCI), the transmitter transmits the measurement reference signals aperiodically.

4. The terminal according to claim 1, wherein the measurement reference signals are sounding reference signals (SRSs).

5. The terminal according to claim 1, wherein the measurement reference signals are mapped to one symbol or to two or more consecutive symbols.

6. A radio communication method for a terminal, comprising:
transmitting measurement reference signals that are allocated discretely at periodic subcarrier intervals across one or more frequency bandwidths, by using Cyclic Prefix Orthogonal Frequency Division Multiplexing (CP-OFDM);
controlling transmission of an uplink shared channel and a phase tracking reference signal; and
controlling to apply precoding to the phase tracking reference signal in a frequency band in which the uplink shared channel is transmitted, and not to apply precoding to a phase tracking reference signal in a frequency band other than the frequency band in which the uplink shared channel is transmitted.

7. A base station comprising:
a receiver that receives measurement reference signals that are allocated discretely at periodic subcarrier intervals across one or more frequency bandwidths of resource block groups (RBGs), by using Cyclic Prefix Orthogonal Frequency Division Multiplexing (CP-OFDM); and
a processor that controls reception of an uplink shared channel and a phase tracking reference signal,
wherein precoding is applied to the phase tracking reference signal in a frequency band in which the uplink shared channel is received, and is not applied a phase tracking reference signal in a frequency band other than the frequency band in which the uplink shared channel is transmitted.

8. The terminal according to claim 2, wherein the measurement reference signals are sounding reference signals (SRSs).

9. The terminal according to claim 3, wherein the measurement reference signals are sounding reference signals (SRSs).

10. The terminal according to claim 2, wherein the measurement reference signals are mapped to one symbol or to two or more consecutive symbols.

11. The terminal according to claim 3, wherein the measurement reference signals are mapped to one symbol or to two or more consecutive symbols.

12. The terminal according to claim 4, wherein the measurement reference signals are mapped to one symbol or to two or more consecutive symbols.

13. A system comprising a terminal and a base station, wherein:
the terminal comprises:
a transmitter that transmits measurement reference signals that are allocated discretely at periodic subcarrier intervals across one or more frequency bandwidths, by using Cyclic Prefix Orthogonal Frequency Division Multiplexing (CP-OFDM); and a processor of the terminal that controls transmission of an uplink shared channel and a phase tracking reference signal; and the base station comprises:
a receiver that receives the measurement reference signals, by using Cyclic Prefix Orthogonal Frequency Division Multiplexing (CP-OFDM); and
a processor of the base station that controls reception of the uplink shared channel and the phase tracking reference signal, wherein the processor of the terminal controls to apply precoding to the phase tracking reference signal in a frequency band in which the uplink shared channel is transmitted, and not to apply precoding to a phase tracking reference signal in a frequency band other than the frequency band in which the uplink shared channel is transmitted.

* * * * *